United States Patent
Liao et al.

(10) Patent No.: US 7,992,601 B2
(45) Date of Patent: Aug. 9, 2011

(54) AIR ENCLOSURE PROVIDED WITH CUT HOLE TYPE AIR LOCK VALVES AND CUT HOLE TYPE AIR LOCK VALVE

(75) Inventors: Chian Hua Liao, Sindian (TW); Yao Sin Liao, Sindian (TW); Bo Xin Jian, Sindian (TW)

(73) Assignee: Yao Sin Liao, Sindian (TW)

( * ) Notice: Subject to any disclaimer, the term of this patent is extended or adjusted under 35 U.S.C. 154(b) by 1134 days.

(21) Appl. No.: 11/742,991

(22) Filed: May 1, 2007

(65) Prior Publication Data

US 2008/0121307 A1    May 29, 2008

(30) Foreign Application Priority Data

Nov. 24, 2006 (TW) .............................. 95220759 U

(51) Int. Cl.
*B65B 1/04* (2006.01)
(52) U.S. Cl. ........ 141/313; 141/114; 137/223; 137/846; 383/3; 383/37; 383/58
(58) Field of Classification Search .................. 137/223, 137/846; 383/3, 58, 37, 44; 141/114, 313–315, 141/317, 66; 206/522
See application file for complete search history.

(56) References Cited

U.S. PATENT DOCUMENTS

| 5,451,179 A | * | 9/1995 | LaRoi et al. | .................. 446/224 |
| 6,015,047 A | * | 1/2000 | Greenland | .................... 206/522 |
| 6,015,601 A | * | 1/2000 | Garcia | ......................... 428/35.8 |
| 2008/0060718 A1 | * | 3/2008 | Liao et al. | ..................... 141/114 |

* cited by examiner

*Primary Examiner* — Gregory L Huson
*Assistant Examiner* — Jason K Niesz
(74) *Attorney, Agent, or Firm* — Rabin & Berdo, P.C.

(57) ABSTRACT

A cut hole type air lock valve is disposed in an air chamber formed by allowing two outer films to be adhered to each other by means of hot sealing. A part of rims of both inner films folded together are adhered to each other and several portions of rims thereof are formed to be air inlets in the cut hole type air lock valve. Furthermore, the air inlet is connected to an air passageway between the inner films, and at least one cut hole is disposed on the inner films beside the air passageway. When outside air flows into the air passageway via the air inlet and is filled in an air chamber via the cut holes, the air chamber is caused to fill with air and inflate, and air inside air chamber thrusts the inner films so as to block the air passageway to cause the air to be locked.

14 Claims, 19 Drawing Sheets

AIR ENCLOSURE PROVIDED WITH CUT HOLE TYPE AIR LOCK VALVES AND CUT HOLE TYPE AIR LOCK VALVE

CROSS-REFERENCES TO RELATED APPLICATIONS

This non-provisional application claims priority under 35 U.S.C. §119(a) on Patent Application No(s). 095220759 filed in Taiwan, R.O.C. on Nov. 24, 2006, the entire contents of which are hereby incorporated by reference.

FIELD OF INVENTION

The present invention relates to an air enclosure and air lock valves thereof, and more particularly to an air enclosure provided with cut hole type air lock valves and a cut hole type air lock valve.

BACKGROUND

A conventional buffering manner used on a packed article always uses a plastic sheet with a several small projecting air bag disposed thereon to cover the surroundings of the article to attain to the shock absorption and the buffering functions. But, shock absorption ability of the small air bags is limited; they cannot absorb larger shock or impulse such that the shock absorption and the buffering effects cannot be reached. Therefore, an air packing bag manufactured from a resin film material is developed.

Please refer to FIGS. 1A to 1C. A plurality of air inlets A11 are disposed on an air packing bag A10, an air passageway is connected to each air inlet A11 and a plurality of air chambers A13 are respectively connected to two sides of the air passageway A13. An air valve constituted by a upper air valve film A141 and a lower air valve film A142 is disposed on each air chamber A13. Whereby, the air packing bag A10 can be filled with air to bulge and taken as a buffer material after outside air flows through the air inlet A1, the passageway A12 and into the air chamber A1, for example, The U.S. Pat. No. 4,850,912 entitled "Container for sealingly containing a fluid", The U.S. Pat. No. 5,261,466 entitled "Process for continuously filling fluid into a plurality of closed bags", The U.S. Pat. No. 5,427,830 entitled "Continuous, inflatable plastic wrapping material" and Japan utility model patent publishing No. H5-95851 entitled "Seal bag for fluids". However, the multiple air Valves A14 need be disposed on such kind of air packing bag A10 such that the multiple air chambers A13 can be filled with air; the dispositions of the air valves A14 increase the production cost broadly for manufacturing processes. Moreover, such kind of structure allows the air chamber A13 close to the air inlet A11 to be filled with air to inflate first and the air chamber A13 far away from the air inlet A11 to be filled with air slower or inefficiently to cause the buffering effect of the air packing bag A10 after being filled with air to be bad.

Therefore, for improving the structures of the air packing bag and the valve mentioned above to allow the multiple air chambers to be filled with air at the same time, and further to reduce the production cost of the manufacturing processes, the present invention is proposed.

SUMMARY

For improving the deficits mentioned above, the present invention proposes a cut hole type air lock valve assembled between two outer films which are adhered to each other by hot sealing to form a air chamber. The air lock valve comprises two inner films, an air inlet, an air passageway and at least one cut hole. The inner films folded to each other vertically, in which parts of rims of the inner films are adhered to each other. The air inlet is formed by other parts of rims of the inner films which are not adhered to each other. The air passageway is connected to the air inlet and formed between the inner films. The cut holes are disposed on the inner films and each cut hole is disposed on one side of the air passageway.

The present invention also proposes an air enclosure provided with air lock valve on which cut holes are disposed comprises two outer films, two inner films, a plurality of air chambers, a plurality of air passageways and a plurality of cut holes. The outer films are folded together vertically. The inner films are positioned between the outer films and lower sides of the inner films are adhered to each other. The air chambers are formed between the outer films by allowing the outer films to be adhered to each other by means of hot sealing. The air inlets are formed between the inner films and used for allowing outside air to be filled in. The air passageways are respectively connected to the air inlets and formed between the inner films. Furthermore, the cut holes are disposed on the inner films and each cut hole is disposed on one side of the air passageway.

After outside air flows into the air passageway through the air inlet, it can be filled in the air chamber through the cut holes to cause the air chamber to be inflated. In the meantime, the air in the air chamber presses the inner films so as to block the air passageway to cause the air in the chamber not to leak out.

BRIEF DESCRIPTION OF THE DRAWINGS

The present invention can be more fully understood by reference to the following description and accompanying drawings, in which.

DETAILED DESCRIPTION

Figure 1A:
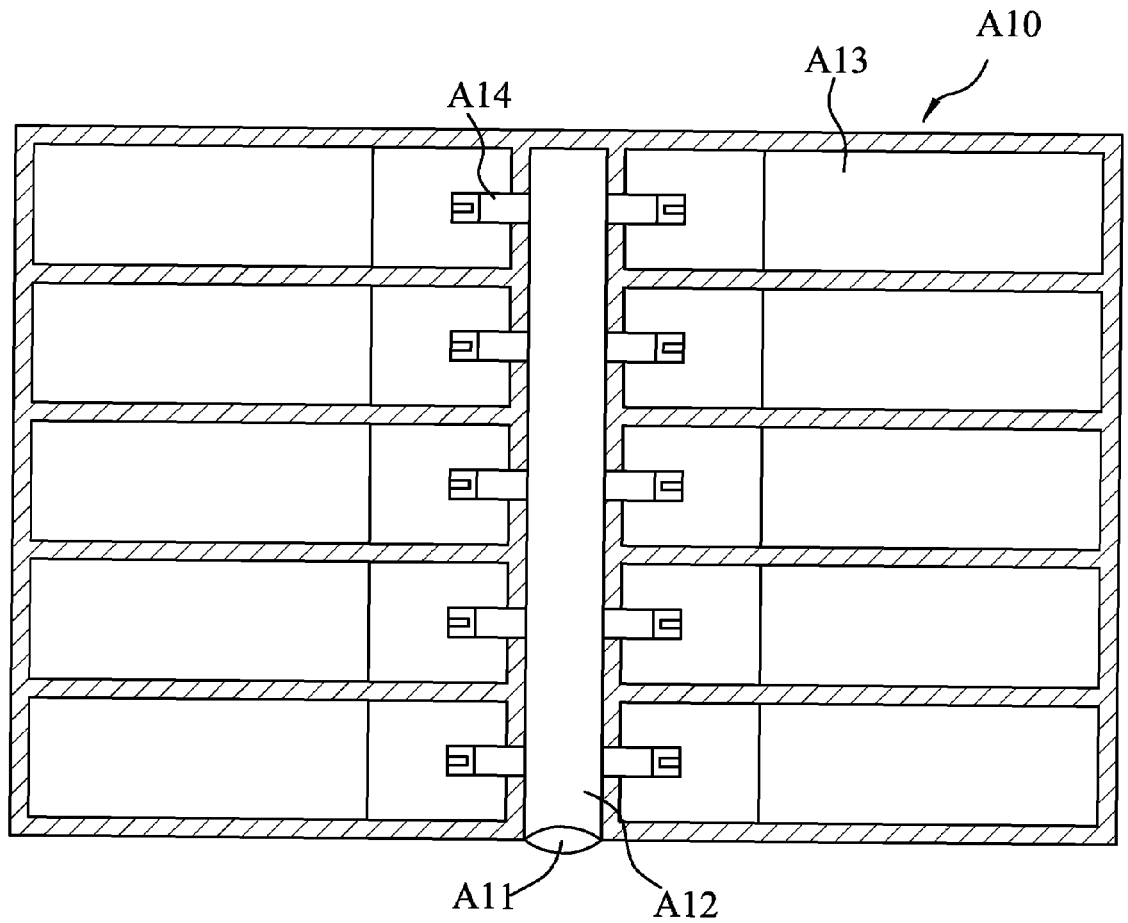
FIG. 1A is a schematic view of a conventional air packing bag before being filled with air.
Figure 1B:
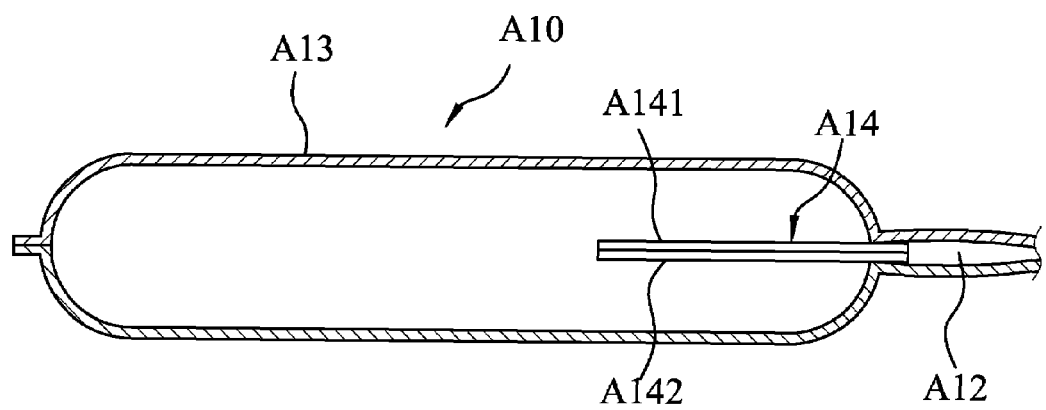
FIG. 1B is a cross sectional view of a conventional air packing bag after being filled with air.
Figure 1C:
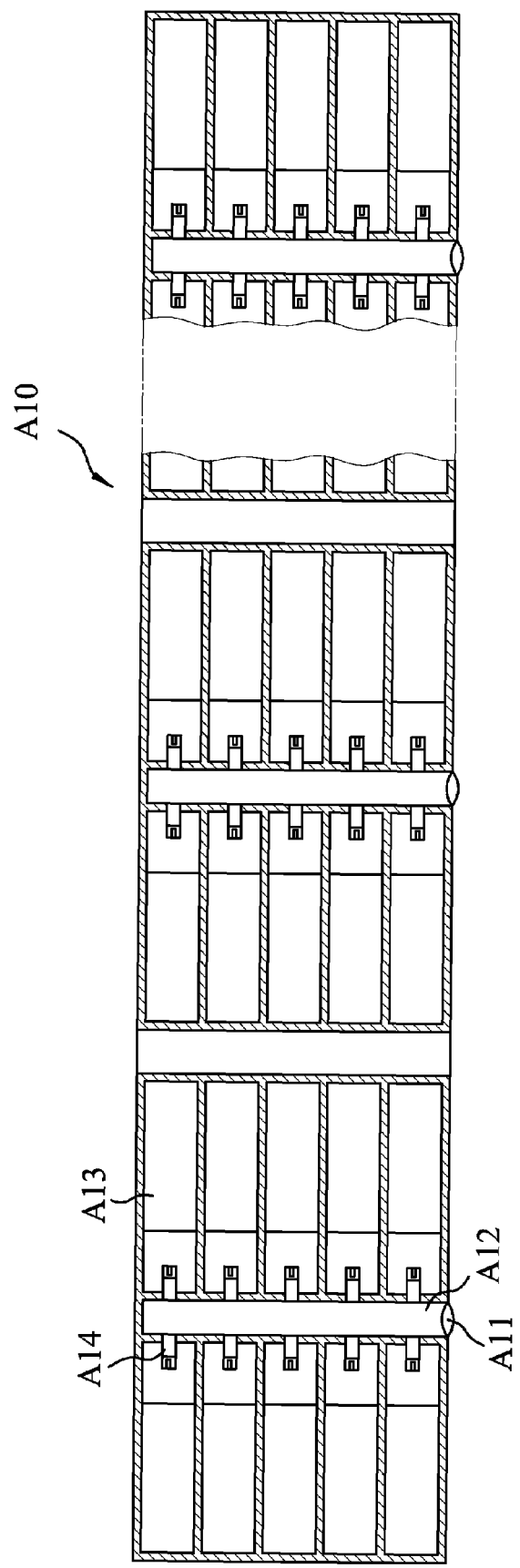
FIG. 1C is a schematic view of a conventional air packing bag before being filled with air.
Figure 2:
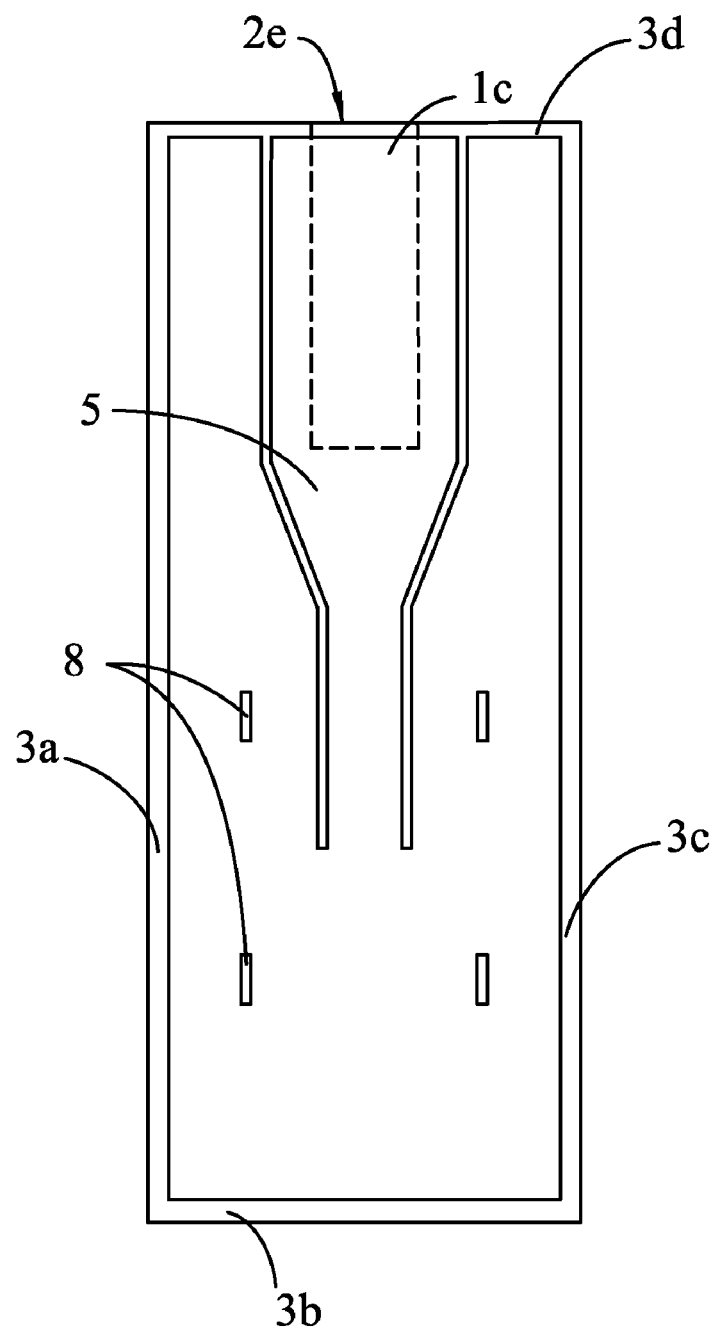
FIG. 2 is a schematic view, showing an air enclosure of a first preferred embodiment according to the present invention.
Figure 3:
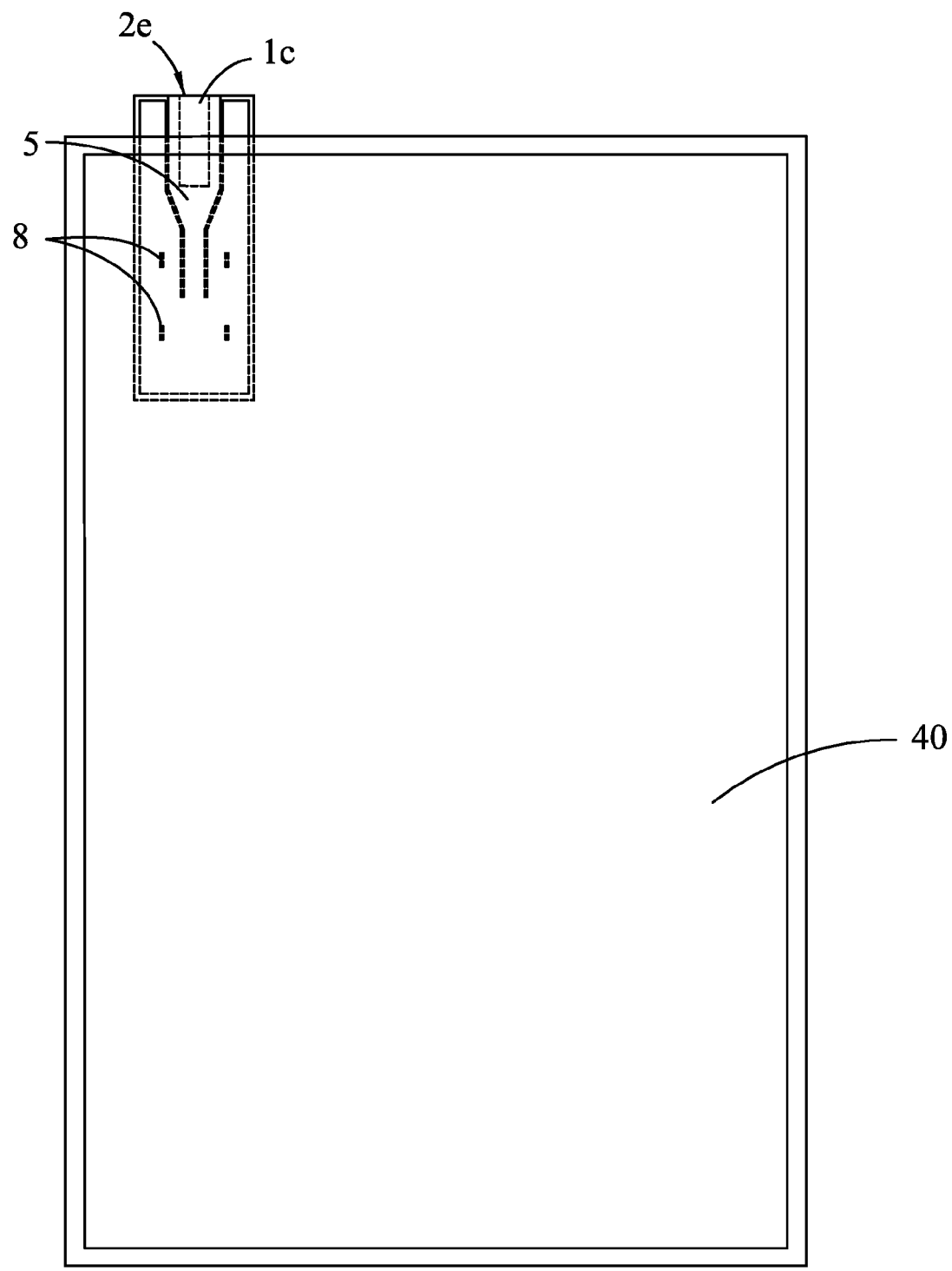
FIG. 3 is a schematic view, showing an air enclosure before being filled with air of a first preferred embodiment according to the present invention.
Figure 4A:
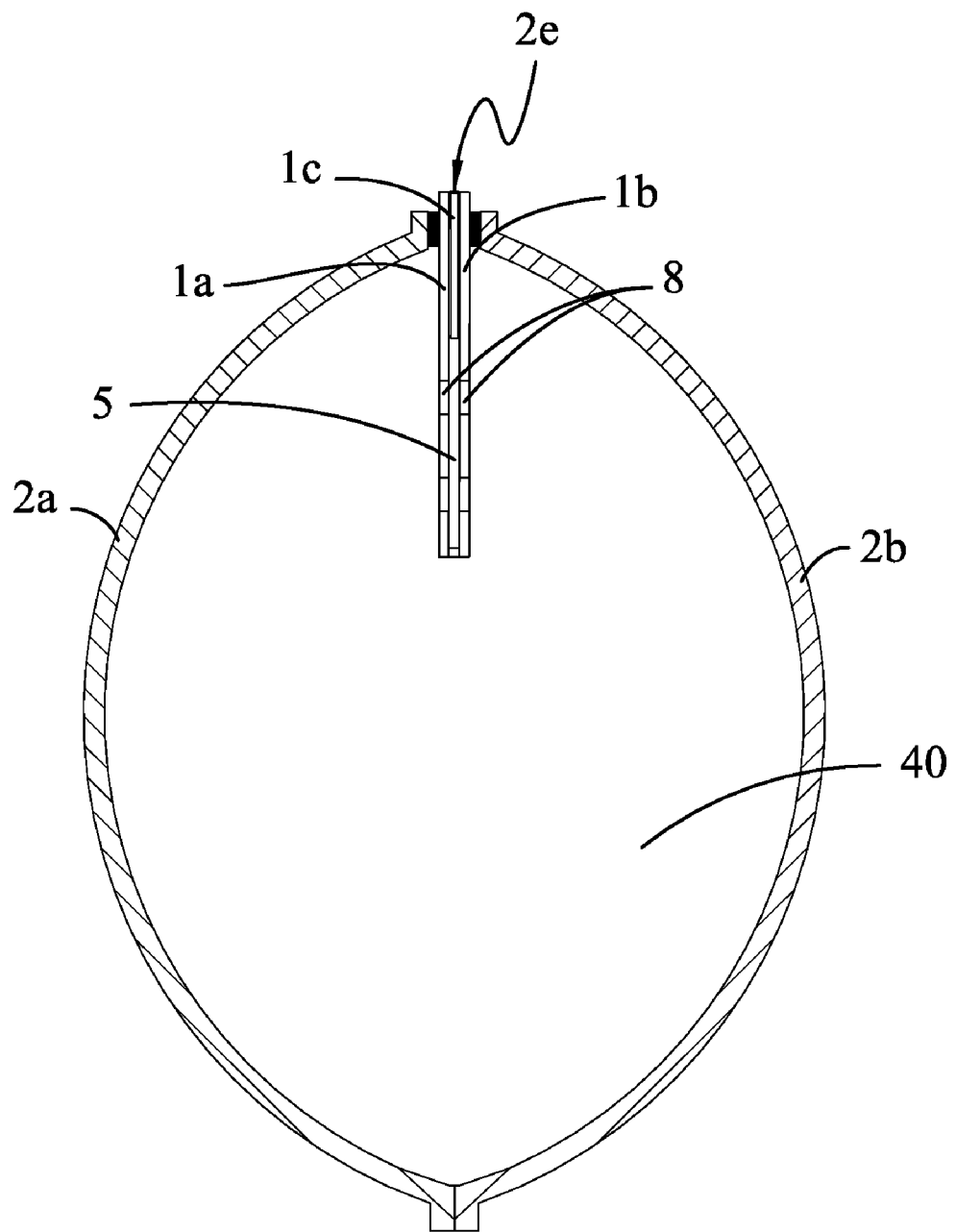
FIGS. 4A and 4B are cross sectional views, respectively showing an air enclosure after being filled with air in one and another states of a first preferred embodiment according to the present invention.
Figure 4B:
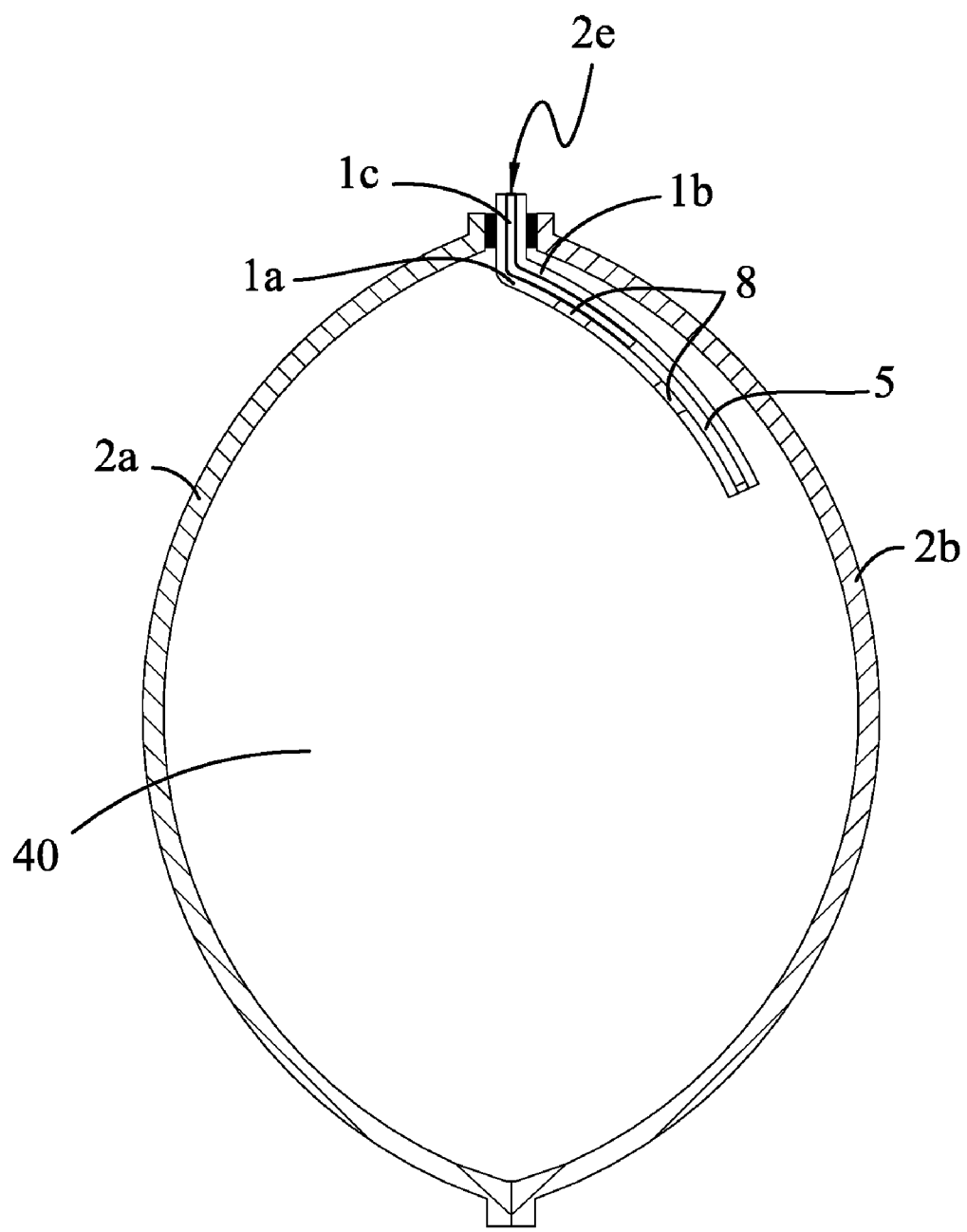

Please refer to FIGS. 2, 3, 4A and 4B. FIG. 2 is a schematic view, showing an outlook of an air chamber of a first preferred embodiment of a first embodiment according to the present invention. FIG. 3 is a schematic view, showing an air chamber of an air enclosure of a first preferred embodiment according to the present invention n before being filled with air. FIGS. 4A and 4B are cross sectional views, respectively showing an air chamber of a preferred embodiment according to the present invention after being inflated.

An air valve on which cut holes are disposed comprises two inner film 1a and 1b, an air inlet 2e, an air passageway 5 and a plurality of cut holes 8.

The inner films 1a and 1b are folded together vertically and hot sealing is processed along hot sealing lines 3a, 3b, 3c and 3d to cause parts of rims of the inner films 1a and 1b to be adhered to each other. Here, the hot sealing can be hot molding pressing.

The air inlet 2c is formed by spreading a heat resistant material 1c between the inner films 1a and 1b, for example, printing heat resistant resin or ink by means of printing and sticking films 1a and 1b together by means of hot sealing, i.e. the air inlet 2e is positioned between not-adhered-to-each-other parts of the rims of the inner films 1a and 1b that are not adhered to each other.

The air passageway 5 is connected to the air inlet 2e, formed between the inner films 1a and 1b by spreading a heat resistant material 1c between the inner films 1a and 1b to allow them not to be adhered to each other even by means of hot sealing and taken as a passageway allowing outside air to flow through.

The cut holes 8 are positioned on the inner films 1a and 1b and distributed on one side of the air passageway or two sides thereof. Furthermore, the cut hole 8 is an opening formed by tearing the inner films 1a and 1b or a through hole formed by using a sharp tool to pierce the inner films 1a and 1b.

The air lock valve is assembled on the chamber 40 formed by allowing the outer films 2a and 2b to be adhered to each other by means of hot sealing before being used. When air filling is processed, the inner films 1a and 1b are pulled apart outward to open the air inlet 2e to allow outside air to enter the air passageway through the air inlet 2e, and one part of air flows to the left side of the air passageway 5 and into the air chamber 40 through the cut holes 8 thereof, and another part of air flows to the right side of the air passageway 5 and into the chamber 40 through the cut holes 8 thereof to enable the air chamber 40 to be filled with air to inflate.

The air pressure inside the air chamber 40 presses the inner films 1a and 1b to attach onto the outer film 2a or 2b after the air chamber 40 is filled with air and inflated, the air passageways 5 is blocked to seal the air chamber 40 to allow air in the air chamber 40 not to leak so as to attain to the air locking effect.

The structure according to the present invention, when the inner films 1a and 1b are thrust by the air pressure inside the air chamber 40, they can be attached onto the outer film 2a or 2b closely or cannot be side-attached onto the film 2a or 2b but hang in the air chamber 40.

The air passageway 5 mentioned above is curved by means of hot sealing, and the width of one end of the air passageway 5 connected to the air inlet 2e wider than the one of another end thereof; this allows the air pressure in the curved portion of the air passageway 5 is larger than the air pressure in two sides thereof to cause air of the air inlet 2e is easy to enter and not easy to flee out, the curved portion of the air passageway 5 is thrust closely to attain to the air locking effect when the pressure inside the air chamber 40 increases. Furthermore, the air passageway 5 can also be multiple points type, twin curves type or straight line type air flowing route.

Figure 5:
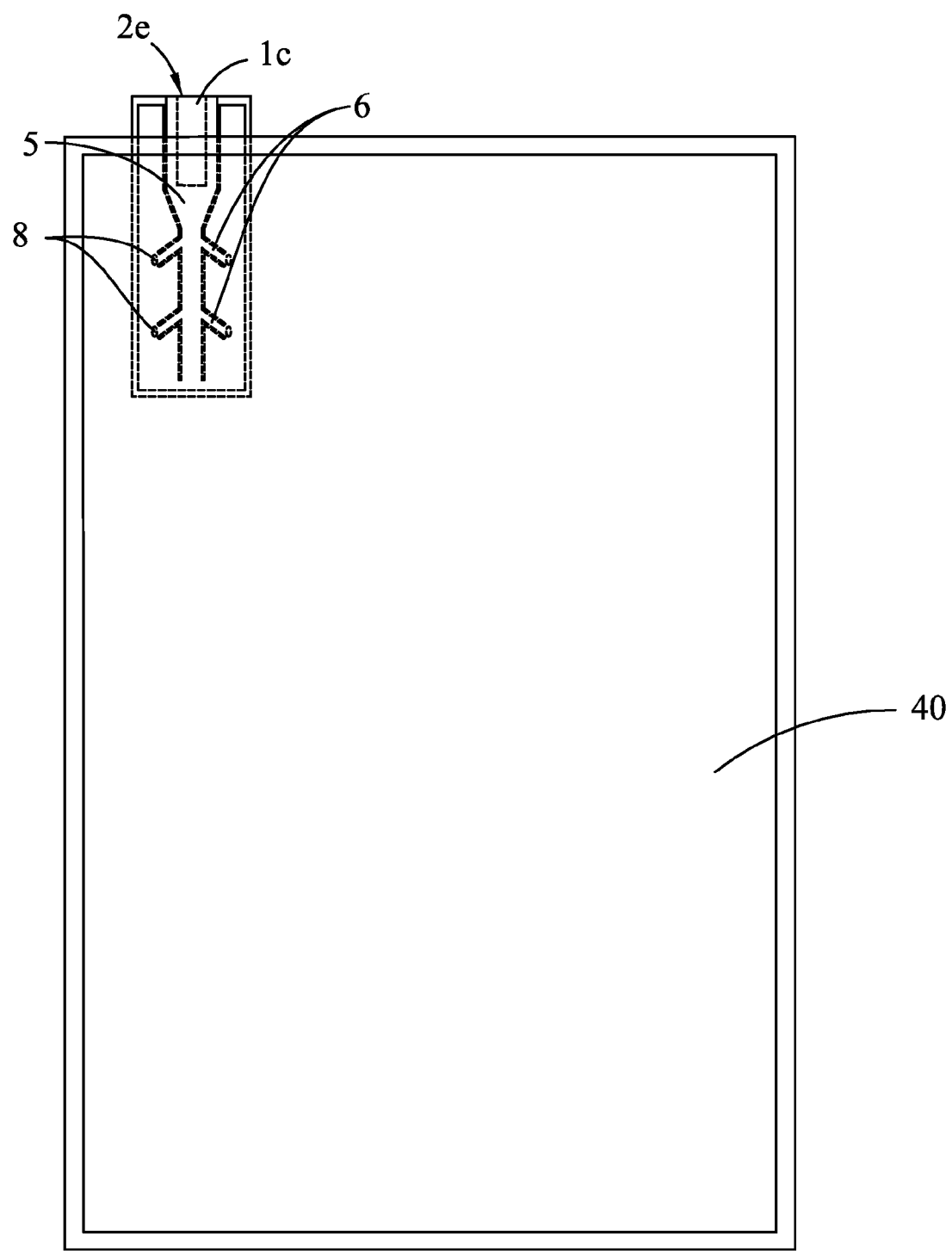
FIG. 5 is a schematic view, showing an air enclosure before being filled with air of a second preferred embodiment according to the present invention.

Please refer to FIG. 5 is a schematic view, showing an air enclosure before being filled with air of a second preferred embodiment according to the present invention.

In the embodiment, the air enclosure further comprises a plurality of branch passageways 6; they are formed by spreading a heat resistant material 1c between the inner films 1a and 1b and allowing the inner films 1a and 1b not to be adhered to each other even by hot sealing and disposed between the inner films 1a and 1b. The branch passageways 6 are used for connecting the air passageway 5 and the cut holes 8.

When air filling is processed, the inner films 1a and 1b are pulled apart outward to open the air inlet 2e to allow outside air to enter the air passageway 5 via the air inlet 2e. Thereafter, the air respectively flows to the branch passageways 6 along the air passageway 5 and then into the air chamber 40 via the cut hole 8 at the end terminal of each branch passageway 6 to cause the air chamber 40 to be filled with air and inflated.

Figure 6:
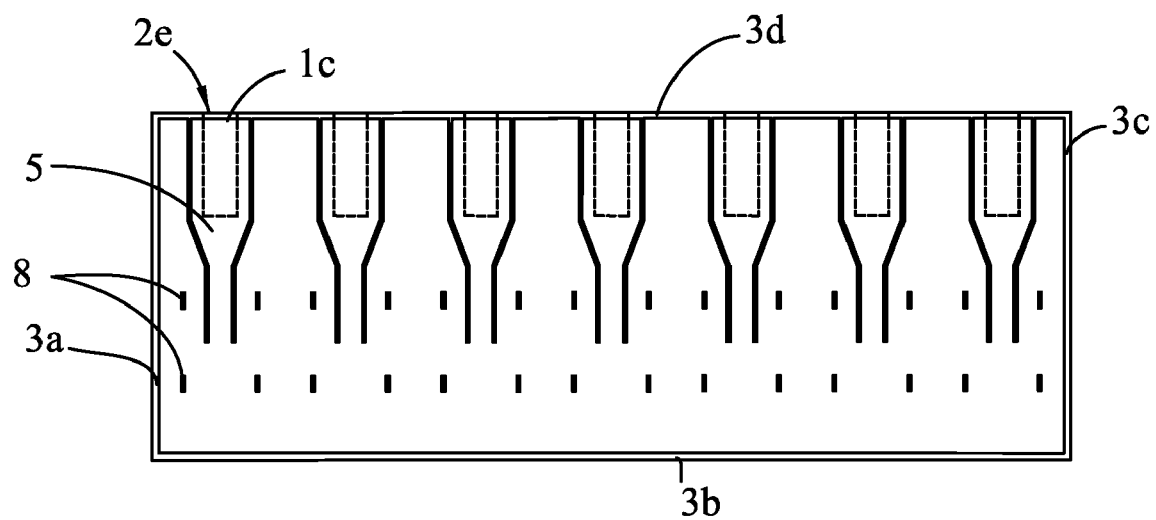
FIG. 6 is a schematic view, showing an air enclosure before being filled with air of a third preferred embodiment according to the present invention.

Please refer to FIG. 6. FIG. 6 is a schematic view, showing an air enclosure of a third preferred embodiment according to the present invention.

Hot sealing is processed to allow the inner films 1a and 1b to be adhered to each other along hot sealing lines 3a, 3b, 3c and 3d to cause a part of rims the inner films 1a and 1b to be adhered to each other. Besides, a heat resistant material 1c is spread between the inner films 1a and 1b to form a plurality of air inlets 2e; each air inlet 2e is connected to the air passageway 5 and a plurality of cut holes 8 are distributed on the sides of each air passageway 5.

Figure 7:
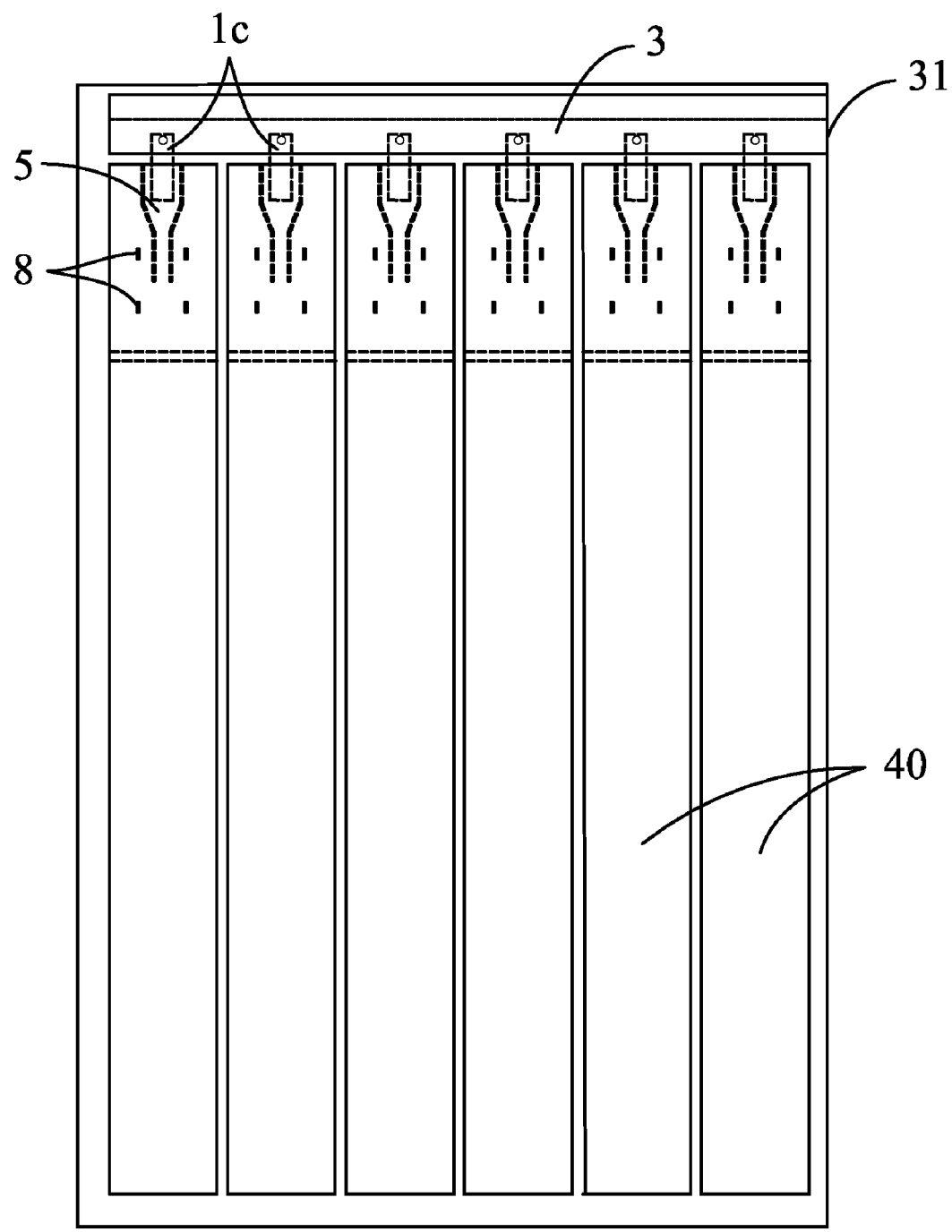
FIG. 7 is a schematic view, showing an air enclosure before being filled with air of a third preferred embodiment according to the present invention.
Figure 8A:
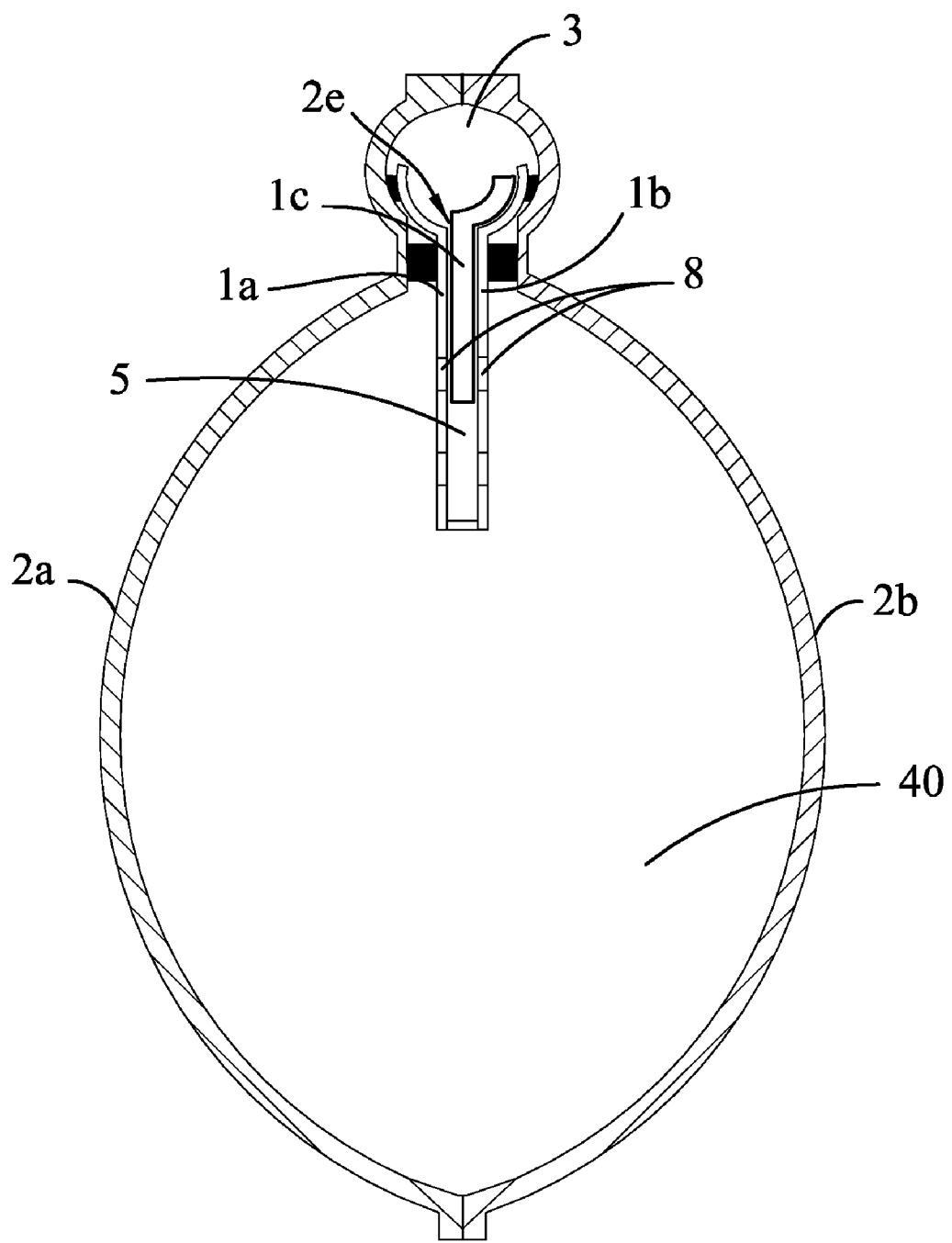
FIGS. 8A and 8B are cross sectional views, respectively showing an air enclosure after being filled with air in one and another states of a fourth preferred embodiment according to the present invention.
Figure 8B:
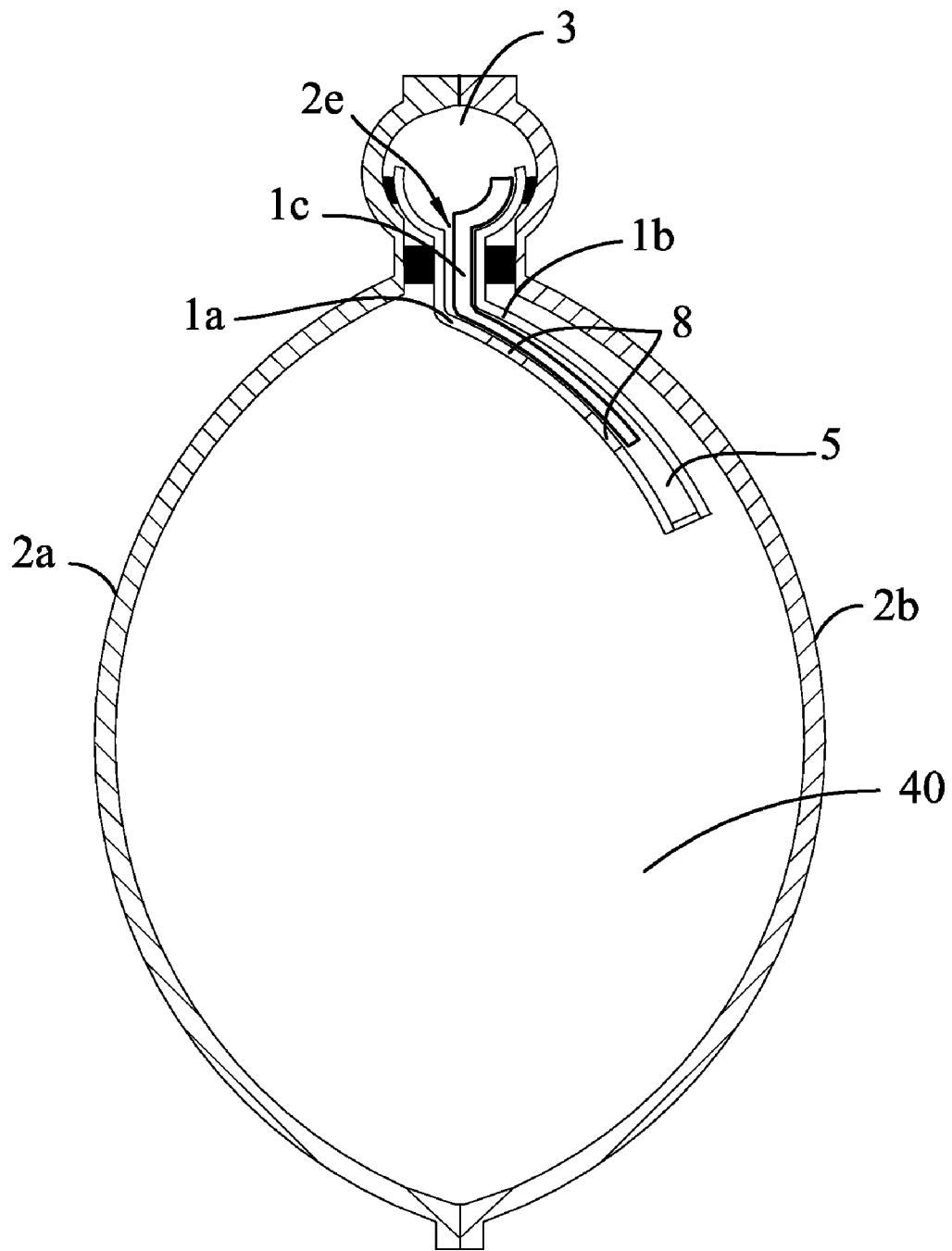

Please refer to FIGS. 7, 8A and 8B. FIG. 7 is an air enclosure before being filled with air of a fourth preferred embodiment according to the present invention. FIGS. 8A and 8B are cross sectional views, showing an air enclosure after being filled with air of a fourth preferred embodiment according to the present invention.

The air enclosure comprises two outer films 2a and 2b, two inner films 1a and 1b, an air filling passageway 3, a plurality of air inlets 2e, a plurality of air passageways 5, a plurality of cut holes 8 and a plurality of air chambers 40.

The outer films 2a and 2b are folded together vertically.

The inner films 1a and 1b are disposed between the outer films 2a and 2b and both lower sides of the inner films 1a and 1b are adhered by means of hot sealing.

The air filling passageway 3 is a space formed by allowing the outer films 2a and 2b to be adhered to each other by means of hot sealing and disposed at one end of the outer films 2a and 2b. Besides, the air filling passageway 3 comprises an air filling entrance 31.

The air inlets 2c are formed by spreading a heat resistant material 1c between the inner films 1a and 1b, for example, printing heat resistant resin or ink by means of printing and allowing the films 1a and 1b to be adhered to each other by means of hot sealing and used for allowing outside air to be filled in.

Each air passageway 5 is connected to the air inlet 2e, formed between the inner films 1a and 1b by spreading a heat resistant material 1c between the inner films 1a and 1b to allow them not to be adhered to each other even by means of hot sealing and taken as a channel for allowing outside air to flow through.

The cut holes 8 are positioned on the inner films 1a and 1b and distributed on one side of each air passageway 5 or two sides thereof. Furthermore, the cut hole 8 is an opening formed by tearing the inner films 1a and 1b or a through hole formed by using a sharp tool to pierce the inner films 1a and 1b.

The air chambers are formed by allowing the outer films 2a and 2b to be adhered to each other by means of hot sealing and used as spaces for storing air. Furthermore, the air chambers 40 are disposed in parallel beside the air filling passageway 3.

When air filling is processed, outside air entering the air filling entrance 31 inflates the air filling passageway 3 to cause the inner films 1a and 1b to be pulled apart outward to open the air inlets 2e. After the outside air enters the air passageways 5 via the air inlets 2e, one part of the outside air flows to the left side of each air passageway 5 and then into each air chamber 40 via the cut holes 8 on the left side thereof. In the meantime, another part of the outside air flows to the right side of each air passageway 5 and then into each air chamber 40 via the cut holes on the right side thereof to cause each chamber 40 to be filled with air and inflated.

The air pressure inside the air chamber 40 presses the inner films 1a and 1b to attach onto the outer film 2a or 2b after the air chamber 40 is filled with air and inflated, the air passageways 5 is blocked to seal the air chamber 40 to allow air in the air chamber 40 not to leak so as to attain to the air locking effect.

Because air pressure in each air passageway 5 can be identical, the air pressure in a front part of the air chamber 40 close to the air filling passageway 3 is equal to the one in a rear part of the air chamber 40 far away from the air filling passageway 3; that the air filling effect is not good or the air filling can not be processed in the rear part of the air chamber 40 will not happen even the front part of the air chamber 40 is first filled with air and inflated. Each air chamber 40 according to the present invention can be filled with air at the same time to increase to air filling speed. Furthermore, an air locking valve need not be assembled on each air chamber 40; it not only reduces the operation procedures and time, but also further lower the production cost.

The structure according to the present invention, when the inner films 1a and 1b are thrust by the air pressure inside the air chamber 40, they can be attached onto the outer film 2a or 2b closely or cannot be side-attached onto the film 2a or 2b but hang in the air chamber 40.

Figure 9:
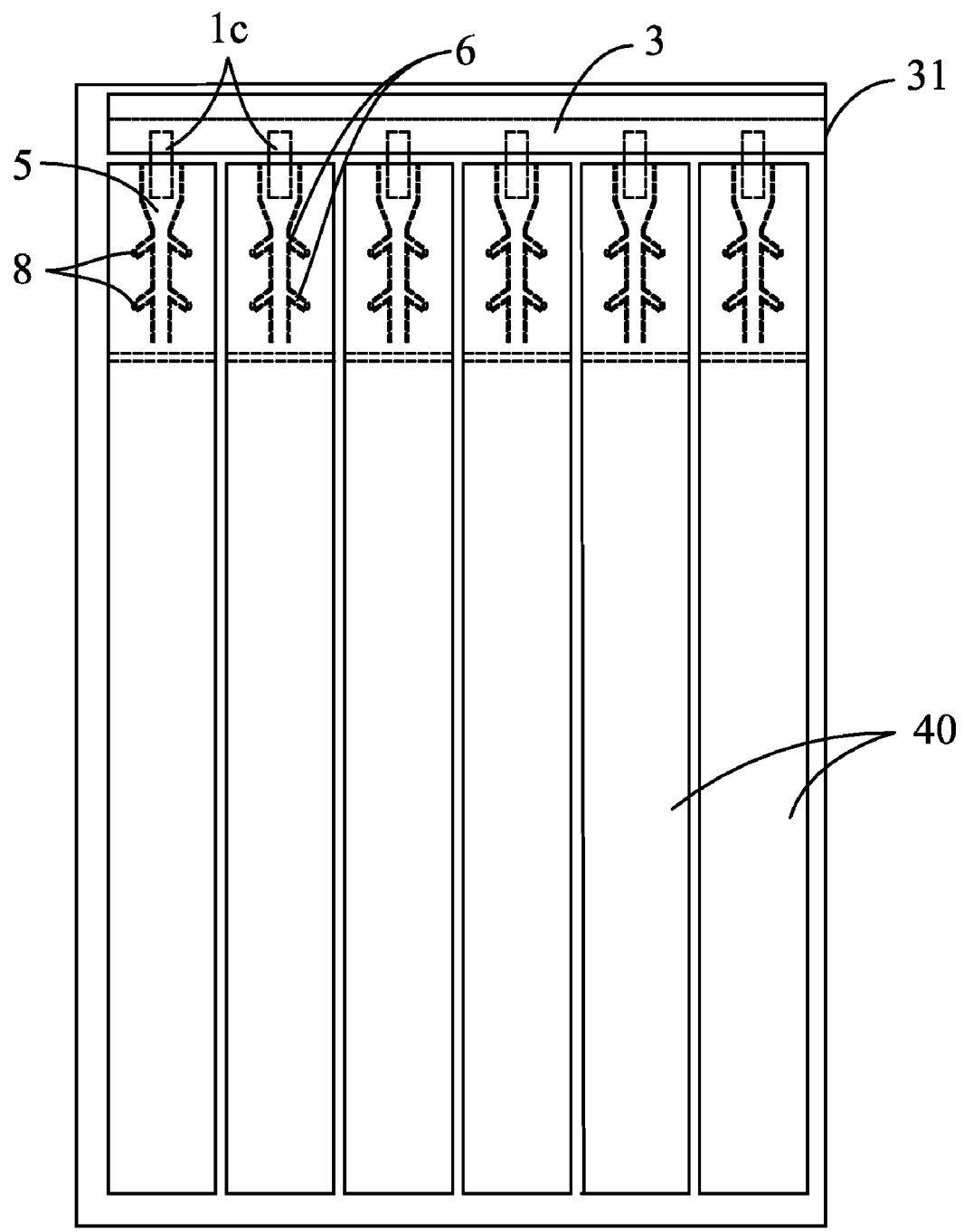
FIG. 9 is a schematic view, showing an air enclosure before being filled with air of a fifth preferred embodiment according to the present invention.

Please refer to FIG. 9 is a schematic view, showing an air enclosure before being filled with air of a second preferred embodiment.

In the embodiment, the air enclosure further comprises a plurality of branch passageways 6; they are formed by spreading a heat resistant material 1c between the inner films 1a and 1b and allowing the inner films 1a and 1b not to be adhered to each other even by hot sealing and disposed between the inner films 1a and 1b. The branch passageways 6 are used for connecting each air passageway 5 and the cut holes 8.

When air filling is processed, outside air entering the air filling entrance 31 inflates the air filling passageway 3 to allow the inner films 1a and 1b to be pulled apart outward to open the air inlets 2e to allow outside air to enter each air passageway 5 via each air inlet 2e. Thereafter, the air respectively flows to the branch passageways 6 along each air passageway 5 and then into each air chamber 40 via the cut hole 8 at the end terminal of each branch passageway 6 to cause each air chamber 40 to be filled with air and inflated.

Figure 10:
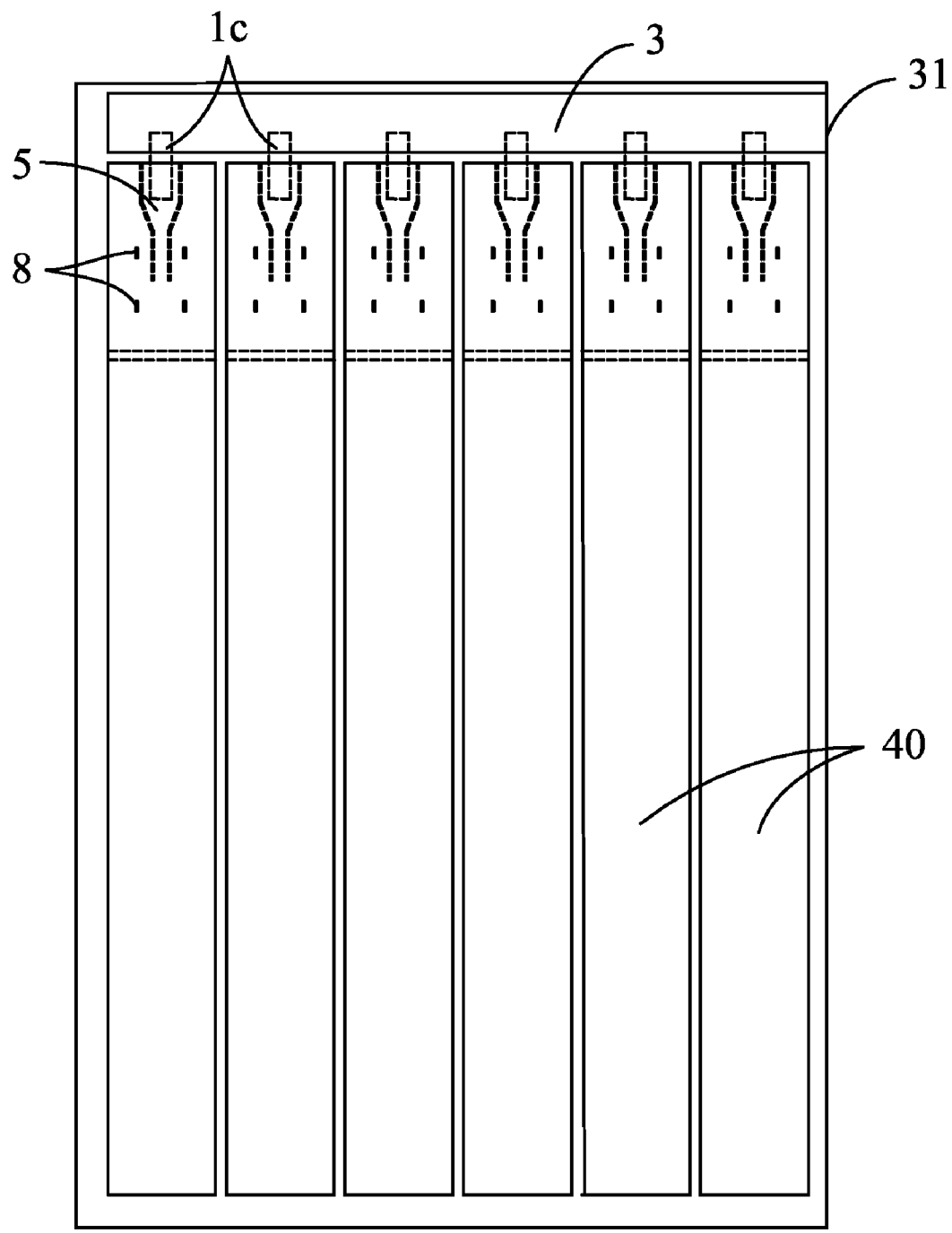
FIG. 10 is a schematic view, showing an air enclosure before being filled with air of a sixth preferred embodiment according to the present invention.
Figure 11A:
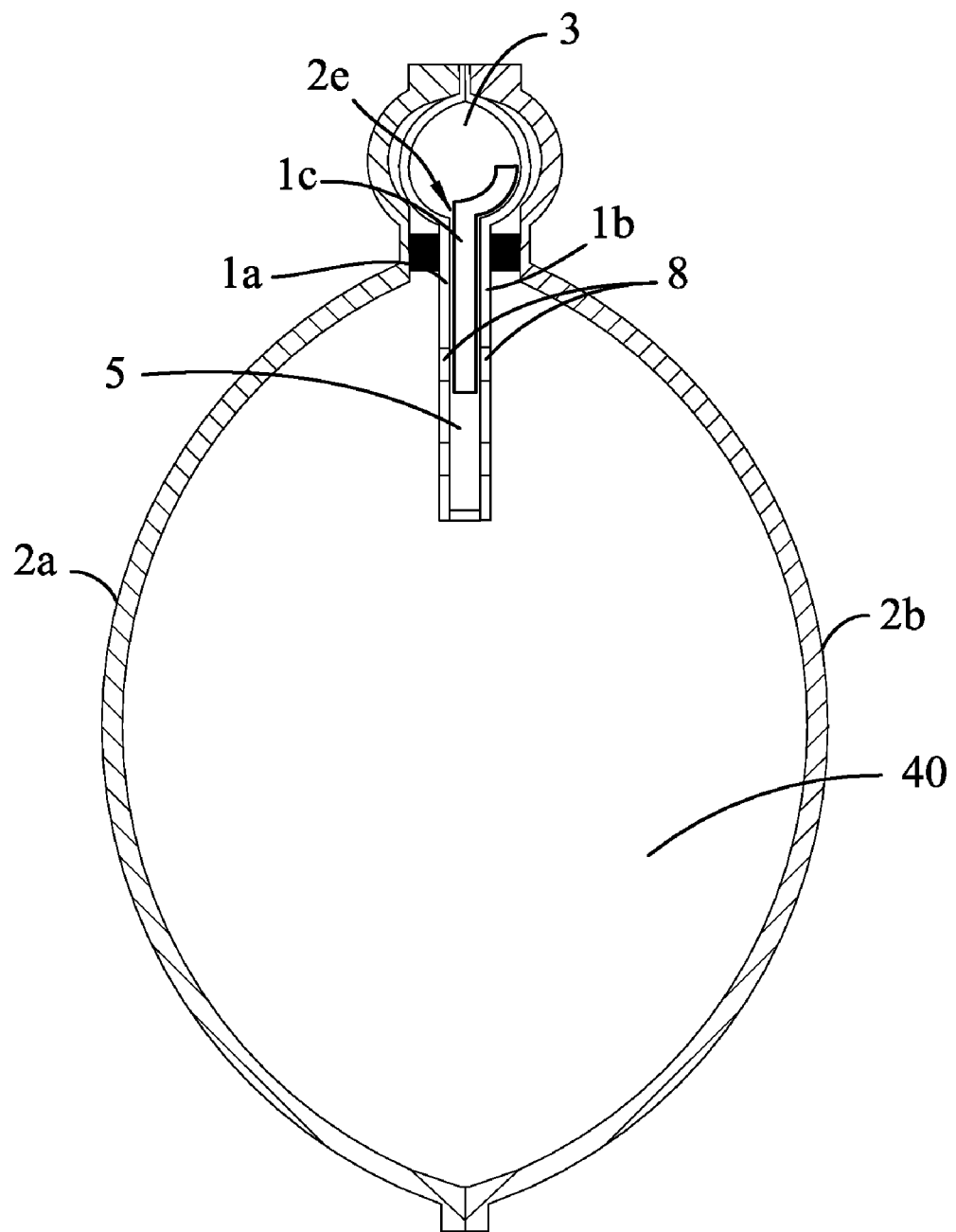
FIGS. 11A and 11B are cross sectional views, respectively showing an air enclosure after being filled with air in one and another states of a sixth preferred embodiment according to the present invention.
Figure 11B:
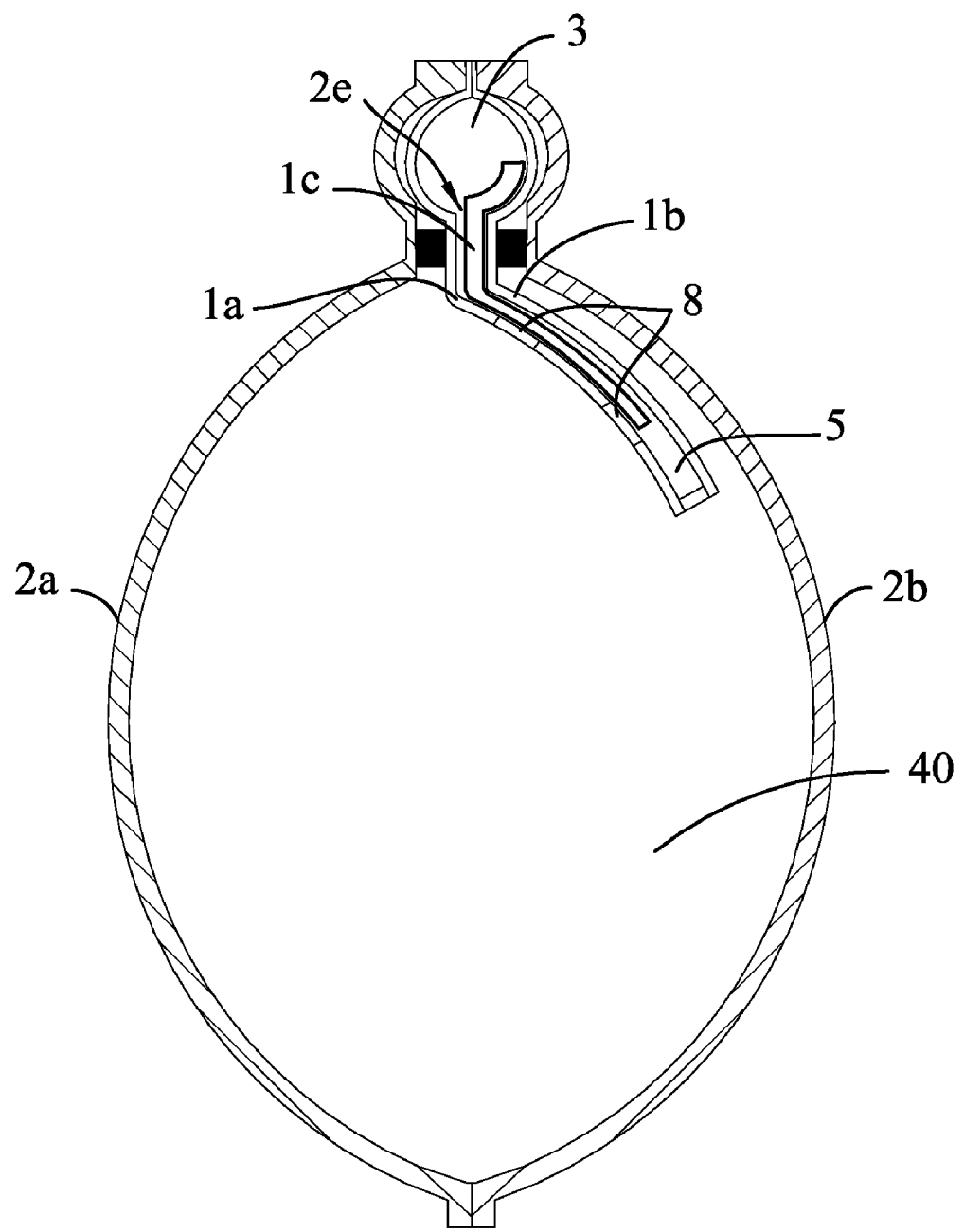

Please refer to FIGS. 10, 11A and 11B. FIG. 10 is an air enclosure before being filled with air of a sixth preferred embodiment according to the present invention. FIGS. 11A and 11B are cross sectional views, showing an air enclosure after being filled with air of a sixth preferred embodiment according to the present invention.

An air filling passageway 3 is a space formed by allowing the outer films 2a and 2b to adhere to each other by means of hot sealing and disposed at one end of the outer films 2a and 2b. Besides, the air filling passageway 3 comprises an air filling entrance 31. Here, a hot sealing line in the same direction as the air filling passageway 3 is formed by allowing the outer films 2a and 2b and the inner films 1a and 1b to be adhered to each other at the lower side of the air filling passageway 3 and a plurality of air inlets 2e are formed at places that a heat resistant material 1c is spread between the inner films 1a and 1b.

When air filling is processed, outside air entering the air filling entrance 31 inflates the air filling passageway 3 to cause the inner films 1a and 1b to be pulled apart outward to open the air inlets 2e. After the outside air enters the air passageways 5 via the air inlets 2e, one part of the outside air flows to the left side of each air passageway 5 and then into each air chamber 40 via the cut holes 8 on the left side thereof. In the meantime, another part of the outside air flows to the right side of each air passageway 5 and then into each air chamber 40 via the cut holes on the right side thereof to cause each chamber 40 to be filled with air and inflated. The air pressure inside the air chamber 40 presses the inner films 1a and 1b to be attached onto the outer film 2a or 2b after the air chamber 40 is filled with air and inflated, the air passageways 5 is blocked to seal the air chamber 40 to allow air in the air chamber 40 not to leak so as to attain to the air locking effect.

The structure according to the present invention, when the inner films 1a and 1b are thrust by the air pressure inside the air chamber 40, they can be attached onto the outer film 2a or 2b closely or cannot be side-attached onto the film 2a or 2b but hang in the air chamber 40.

Figure 12:
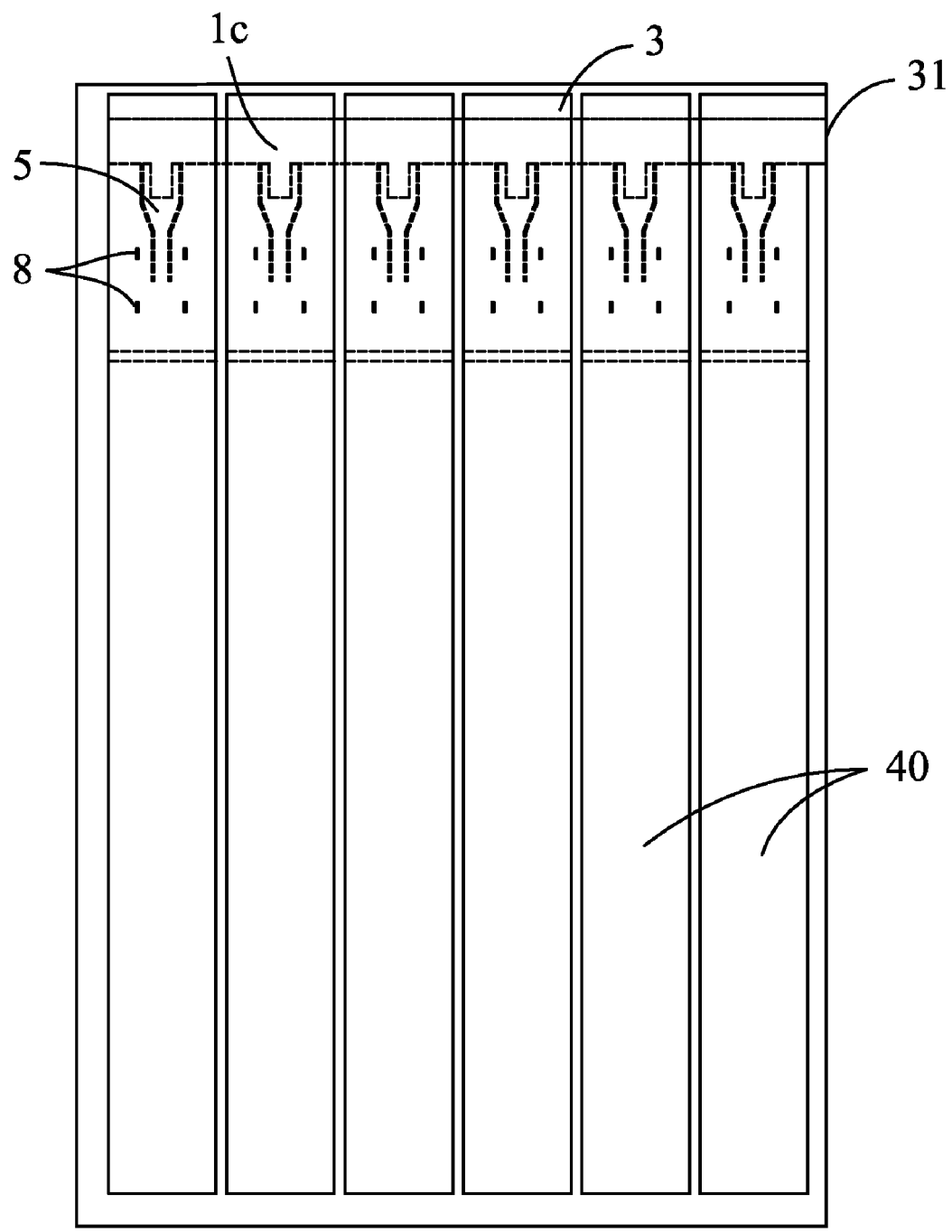
FIG. 12 is a schematic view, showing an air enclosure before being filled with air of a seventh preferred embodiment according to the present invention.
Figure 13A:
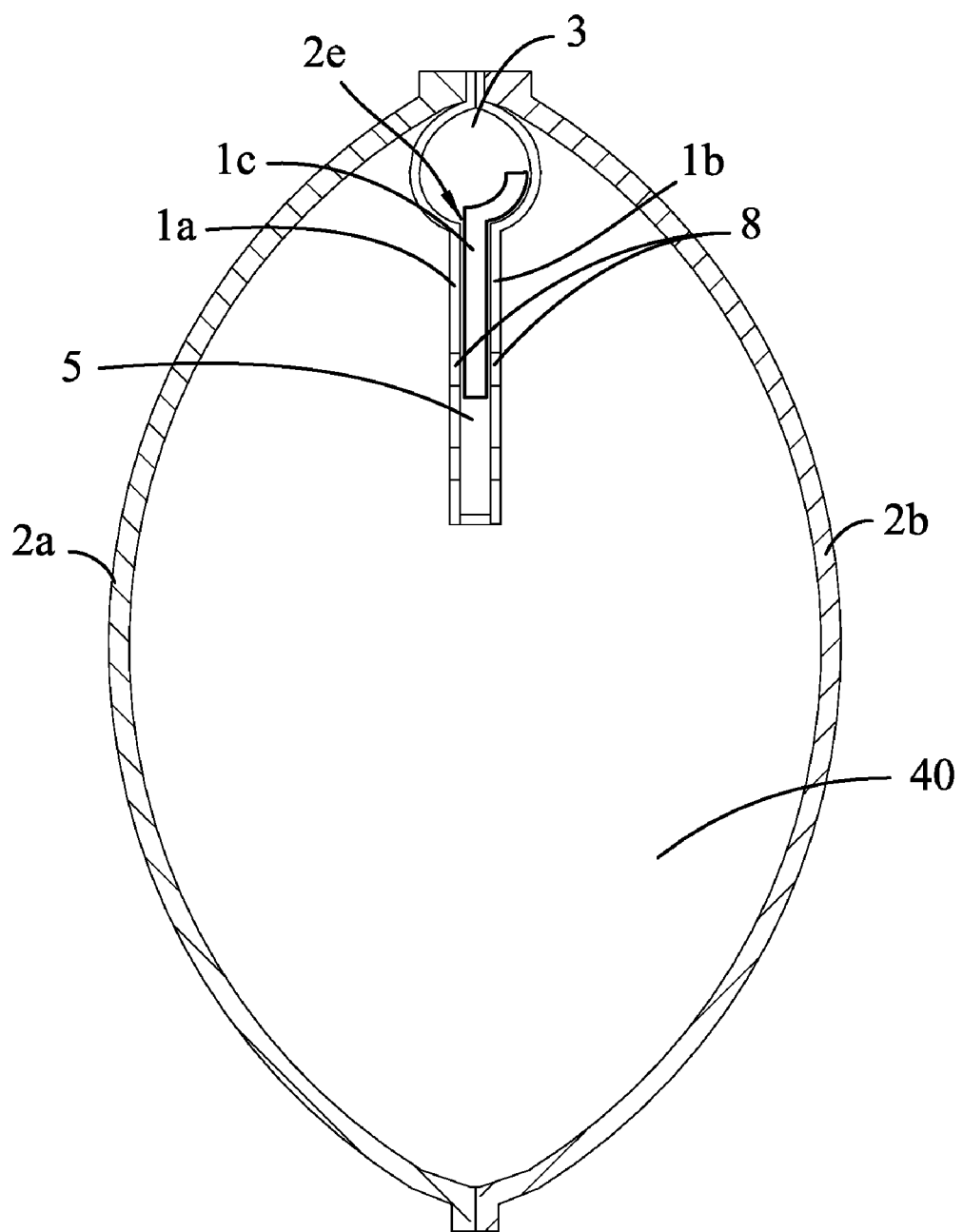
FIGS. 13A and 13B are cross sectional views, respectively showing an air enclosure after being filled with air in one and another states of a seventh preferred embodiment according to the present invention.
Figure 13B:
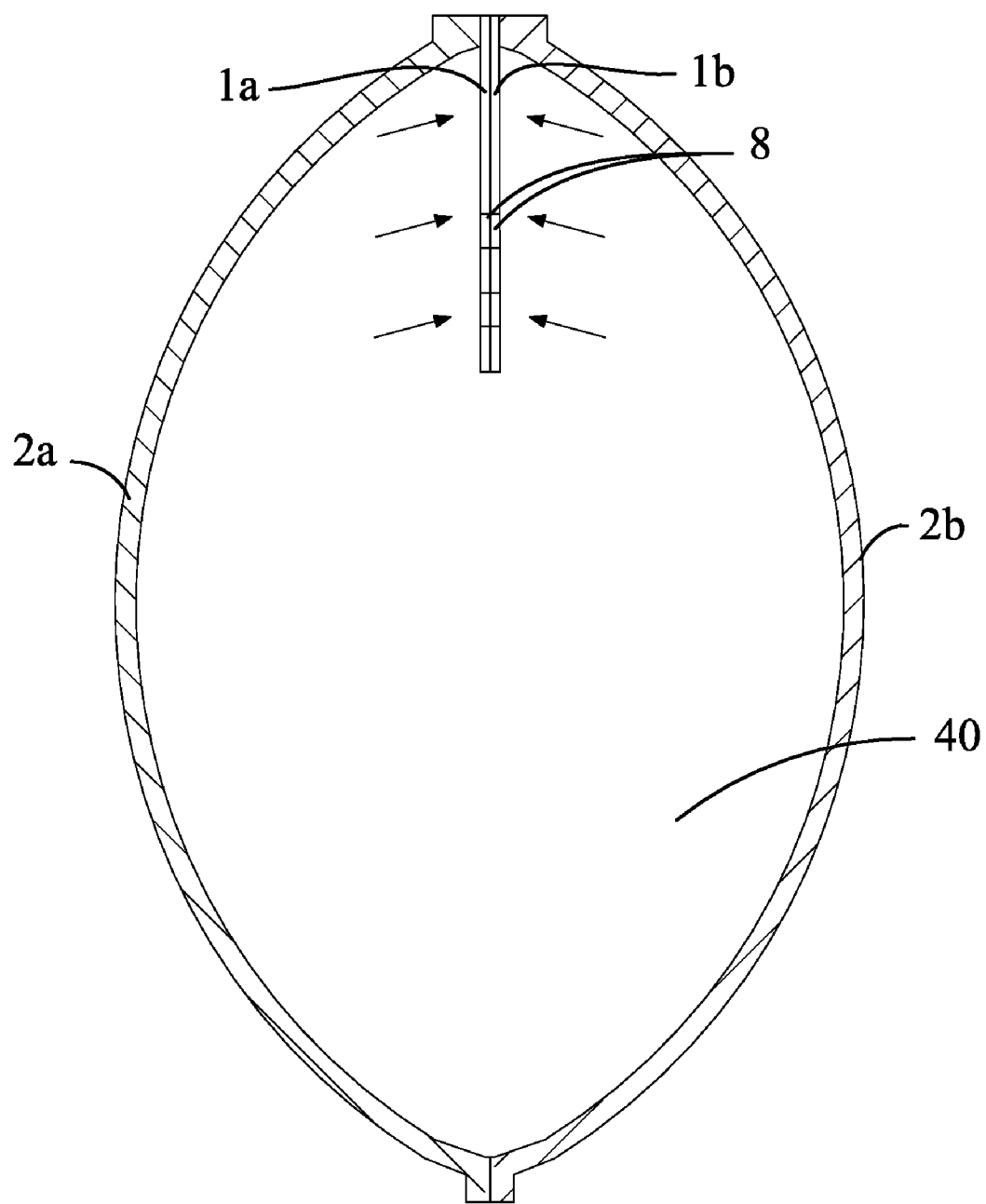

Please refer to FIGS. 12, 13A and 13B. FIG. 12 is an air enclosure before being filled with air of a seventh preferred embodiment according to the present invention. FIGS. 13A and 13B are cross sectional views, showing an air enclosure after being filled with air of a seventh preferred embodiment according to the present invention.

An air filling passageway 3 is a space formed by allowing the outer films 2a and 2b to be adhered to each other by means of hot sealing and disposed at one end of the outer films 2a and 2b. Besides, the air filling passageway 3 comprises an air filling entrance 31. Here, a hot sealing line in the same direction as the air filling passageway 3 is not formed by allowing the outer films 2a and 2b and the inner films 1a and 1b to be adhered to each other at the lower side of the air filling passageway 3.

When air filling is processed, outside air entering the air filling entrance 31 inflates the air filling passageway 3 to cause the inner films 1a and 1b to be pulled apart outward to open the air inlets 2e. After the outside air enters the air passageways 5 via the air inlets 2e, one part of the outside air flows to the left side of each air passageway 5 and then into each air chamber 40 via the cut holes 8 on the left side thereof. In the meantime, another part of the outside air flows to the right side of each air passageway 5 and then into each air chamber 40 via the cut holes on the right side thereof to cause each chamber 40 to be filled with air and inflated. The air pressure inside each air chamber 40 presses the inner films 1a and 1b to block the air filling passageway 3 and each air passageway 5 after each air chamber 40 is filled with air and inflated. Whereby, the air chambers 40 are respectively sealed to allow air in the air chambers 40 not to leak so as to attain to the air locking effect.

The air passageway 5 mentioned above is curved by means of hot sealing, and the width of one end of the air passageway 5 connected to the air inlet 2e wider than the one of another end thereof; this allows the air pressure in the curved portion of the air passageway 5 is larger than the air pressure in two sides thereof to cause air of the air inlet 2e to be easy to enter and not to be easy to flee out, the curved portion of the air passageway 5 is thrust closely to attain to the air locking effect when the pressure inside the air chamber 40 increases. Furthermore, the air passageway 5 can also be multiple points type, twin curves type or straight line type air flowing route.

Figure 14:
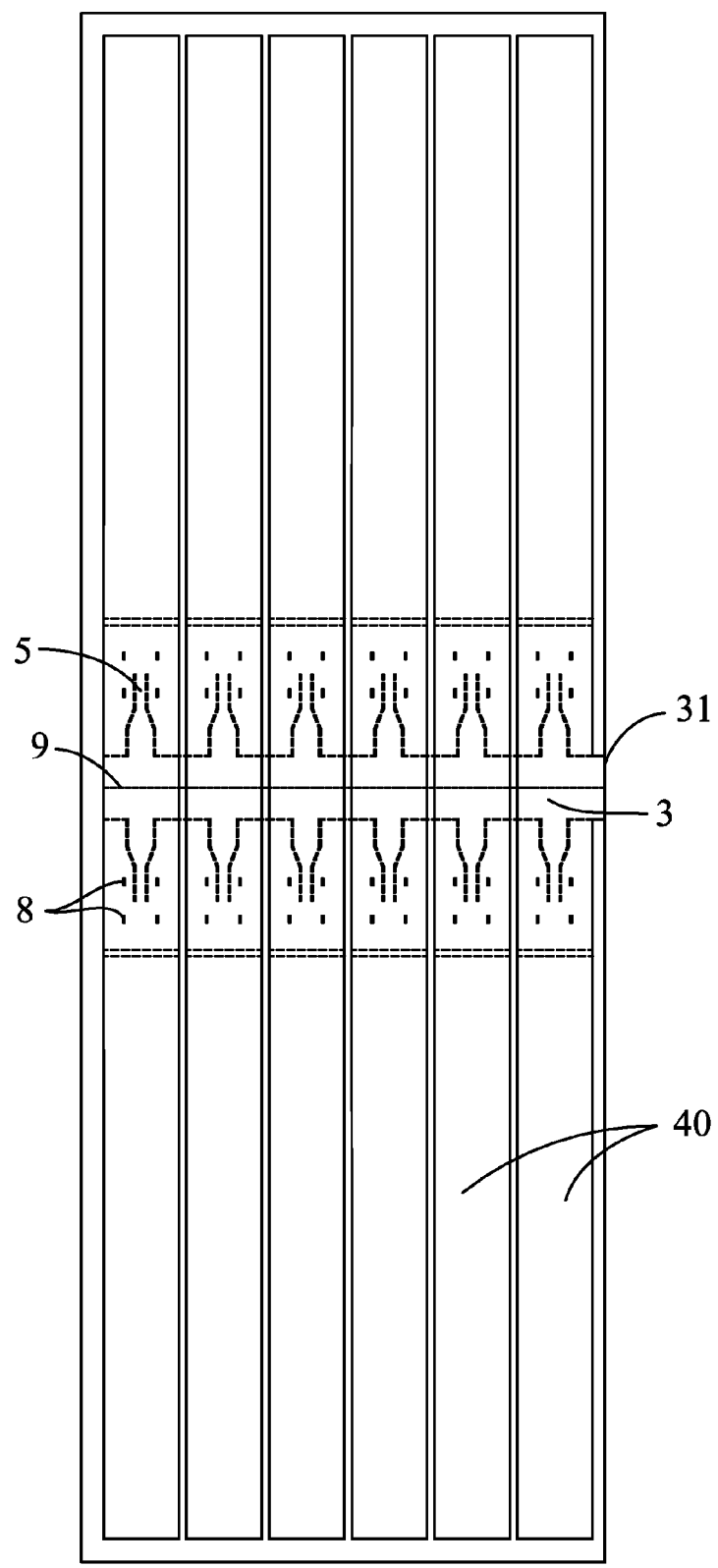
FIG. 14 is a schematic view, showing an air enclosure before being filled with air of a eighth preferred embodiment according to the present invention.

Please refer to FIG. 14 is an air enclosure before being filled with air of a preferred embodiment according to the present invention.

An air filling passageway 3 is positioned at a place in the middle of two inner films 1a and 1b and other two inner films 1a and 1b, and a plurality of air chambers 40 are formed at two ends of the air filling passageway 3. When air is filled, air in the air filling passageway 3 is filled into the air chambers 40 at the both ends thereof at the same time to attain to the air filling time reduction purpose.

Furthermore, a cutting line 9 is disposed on the air filling passageway 3 to allow the air chambers 40 at the both ends of the air filling passageway 3 to be separated by cutting along the cutting line 9 after air is filled; this allows the product output of the air chambers 40 to be double. Furthermore, the cutting line can be added on the air filling passageway 3 by line puncturing so as to be convenient for a user to tear the air chambers 40 apart along the cutting line 9 to enable each air chamber 40 to be used independently and the independently utilized air enclosures can be produced on large scale through the disposition of the cutting line 9.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An air lock valve provided with cut holes, disposed between two outer films, the outer films being adhered to each other by means of hot sealing to form an air chamber, the air lock valve comprising:
    two inner films, folded together vertically, a part of ends thereof being adhered to each other;
    at least one air inlet, formed by severed portions of the partly adhered ends of the inner films;
    at least one air passageway, connected to the air inlet and formed between the inner films; and
    at least one cut hole, disposed on any one of the two inner films, each cut hole being disposed at one side of the air passageway; and
    at least one branch air passageway connecting the air passageway at one end thereof and the cut hole at the other end thereof, wherein
    the air lock valve is adapted to allow outside air to flow into the air passageway via the air inlet and flow to the branch passageway along the air passageway, so that the outside air is filled into the air chamber via the cut hole and the air chamber is filled with air and inflated, and
    the air lock valve is adapted to allow air in the air chamber to thrust the inner films to cause the air passageway to be blocked and the air in the air chamber to be locked.

2. The air lock valve according to claim 1, wherein the cut hole is formed as a torn hole of any one of the inner films.

3. The air lock valve according to claim 1, wherein the cut hole is formed as a pierced hole of any one of the inner films.

4. The air lock valve according to claim 1, wherein one end of the air passageway is wider than another end thereof.

5. The air lock valve according to claim 1, wherein
    the inner films are adhered to each other along hot sealing portions to form the branch air passageway, after a heat resistant material is spread between the inner films.

6. An air enclosure provided with a cut hole type air lock valve, comprising:
    two outer films, folded together vertically;
    two inner films, disposed between the outer films and lower sides of both the inner films being adhered to each other;
    a plurality of air chambers, formed between the outer films, the outer films being adhered to each other along hot sealing portions to define the air chambers between the hot sealing portions;
    a plurality of air inlets, formed between the inner films adapted to allow outside air to be filled therein;
    a plurality of air passageways, respectively connected to the air inlets and formed between the inner films;
    a plurality of cut holes, disposed on the inner films, each cut hole being disposed at a side of the air passageways; and
    at least one branch air passageway connecting one of the air passageways at one end thereof and one of the cut holes at the other end thereof, wherein
    the air enclosure is adapted to allow outside air to flow into the air passageways via the air inlet and flow to the branch passageway along the one of the air passageways, so that the outside air is filled into the air chambers via the one of the cut holes and the air chambers are filled with air and inflated, and
    the air enclosure is adapted to allow the air in the air chambers to thrust the inner films to cause the air passageways to be blocked and the air in the air chamber to be locked.

7. The air enclosure according to claim 6, wherein the cut holes are formed as torn holes of the inner films.

8. The air enclosure according to claim 6, wherein the cut holes are formed as pierced holes of the inner films.

9. The air enclosure according to claim 6, wherein one end of the air passageways is wider than another end thereof.

10. The air enclosure according to claim 6, wherein the inner films are adhered to each other along further hot sealing portions to form the branch air passageway after a heat resistant material is spread between the inner films.

11. The air enclosure according to claim 6, further comprising an air filling passageway disposed between the outer films and adapted to allow the outside air to be filled into the air inlets.

12. The air enclosure according to claim 11, further comprising a cutting line disposed on said the air filling passageway.

13. The air enclosure according to claim 6, further comprising an air filling passageway disposed between the inner films and adapted to allow the outside air to be filled into the air inlets.

14. The air enclosure according to claim 13, further comprising a cutting line disposed on the air filling passageway.

* * * * *